United States Patent
Nicholas et al.

(10) Patent No.: US 9,494,198 B2
(45) Date of Patent: Nov. 15, 2016

(54) UNIVERSAL JOINT WITH PROTECTIVE SHIELD

(71) Applicant: Ford Global Technologies, LLC, Dearborn, MI (US)

(72) Inventors: Christopher Peter Nicholas, Milford, MI (US); Scott Wilson, Lexington, MI (US); Jonathan Gretsky, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 32 days.

(21) Appl. No.: 14/551,623

(22) Filed: Nov. 24, 2014

(65) Prior Publication Data

US 2016/0146263 A1    May 26, 2016

(51) Int. Cl.
| | |
|---|---|
| *F16D 3/84* | (2006.01) |
| *B60K 17/22* | (2006.01) |
| *F16D 3/223* | (2011.01) |
| *F16D 1/076* | (2006.01) |
| *F16D 13/58* | (2006.01) |

(52) U.S. Cl.
CPC .............. *F16D 3/841* (2013.01); *B60K 17/22* (2013.01); *F16D 3/223* (2013.01); *F16D 1/076* (2013.01); *F16D 2003/22326* (2013.01); *F16D 2013/581* (2013.01); *F16D 2300/12* (2013.01); *Y10S 464/906* (2013.01)

(58) Field of Classification Search
CPC ........... F16D 3/10; F16D 3/24; F16D 3/841; B60K 17/22; Y10S 464/906
USPC ................... 464/170, 173-175, 906; 74/609; 135/16, 37
See application file for complete search history.

(56) References Cited

U.S. PATENT DOCUMENTS

| | | | | |
|---|---|---|---|---|
| 541,297 | A * | 6/1895 | Stow | F16C 1/06 |
| | | | | 464/173 |
| 2,008,830 | A * | 7/1935 | Johnson | F16D 3/848 |
| | | | | 464/173 X |
| 3,842,621 | A | 10/1974 | Mazziotti | |
| 4,478,592 | A * | 10/1984 | Krude | F16D 3/845 |
| | | | | 464/173 |
| 6,330,887 | B1 * | 12/2001 | Chen | A45B 19/04 |
| | | | | 135/16 X |
| 2003/0144060 | A1 | 7/2003 | Fuchs et al. | |

FOREIGN PATENT DOCUMENTS

| | | |
|---|---|---|
| JP | 57171124 A | 10/1982 |
| JP | 2010105473 A | 5/2010 |
| KR | 100840836 B1 | 6/2008 |

* cited by examiner

*Primary Examiner* — Gregory Binda
(74) *Attorney, Agent, or Firm* — James Dottavio; Brooks Kushman P.C.

(57) ABSTRACT

A constant velocity (CV) joint includes a conical shield to protect a J-boot from damage due to projectiles such as stones. In order to facilitate vehicle assembly, the conical shield is divided into a number of leaves which each flex radially to permit installation of bolts. When the CV joint is shipped to the vehicle assembly plant, a band is installed to hold the leaves in a stowed position. Once the bolts have been installed to attach the CV joint to a driveline component, the band is removed and the leaves flex to a deployed position in which they protect the J-boot.

4 Claims, 9 Drawing Sheets

UNIVERSAL JOINT WITH PROTECTIVE SHIELD

TECHNICAL FIELD

This disclosure relates to the field of vehicle drivelines. More particularly, the disclosure pertains to a constant velocity universal joint having a deployable protective shield.

BACKGROUND

FIG. 1 schematically illustrates a rear wheel drive vehicle powertrain with an independent rear suspension. Solid lines indicate shafts capable of transferring torque and power. Engine 10 converts chemical energy in the fuel into mechanical power. Transmission 12 modifies the speed and torque to suit current vehicle requirements. At low vehicle speed, the transmission provides torque multiplication for improved performance. At cruising vehicle speed, the transmission increases speed permitting the engine to run at a fuel efficient operating point. The output of transmission 12 is coupled to the input of differential 14 by rear driveshaft 16. Two components are coupled when rotating either component by one revolution causes the other component to rotate by one revolution. Differential 14 distributes the power to left rear wheel 18 and right rear wheel 20 via left axle shaft 22 and right axle shaft 24 respectively. Differential 14 changes the direction of rotation by 90 degrees and multiplies the torque by a final drive ratio. Differential 14 provides approximately equal torque to each wheel while permitting slight speed differences as the vehicle turns a corner.

In a four wheel drive vehicle based on the powertrain of FIG. 1, a transfer case fixed to the transmission divides power between the rear driveshaft 16 and a front driveshaft that directs power to the front wheels via a front differential. In a front wheel drive powertrain, the front differential is typically integrated with the transmission in an assembly called a transaxle. In a four wheel drive vehicle based on a front wheel drive powertrain, a power take-off unit fixed to the transaxle drives a rear driveshaft and a rear drive unit fixed to the rear differential selectively transfers power to the rear differential. Throughout this document, the term transmission should be interpreted to include any transfer case or power take-off unit. Similarly, the term differential should be interpreted to include any rear drive unit.

Engine 10, transmission 12, and rear differential 14 are mounted to vehicle structure. Wheels 18 and 20 are supported via a suspension that allows the wheels to move vertically over road bumps while limiting the vertical movement of the vehicle body. The axis of rotation of engine 10 and transmission 12 may be offset slightly from the input axis of differential 14. Universal joints 26 and 28 accommodate this offset by transmitting torque and power between shafts that rotate about intersecting but not coincident axes. Similarly, universal joints 30, 32, 34, and 36 accommodate the offset between the output axis of differential 14 and the axes of rotation of wheels 18 and 20 even though the axes of rotation of the wheels fluctuates as the wheels absorb road bumps. In some rear wheel drive vehicles, the differential 14 is not mounted directly to the vehicle frame but is instead supported by left and right axles 22 and 24. This eliminates the need for universal joints 30 and 34 but universal joints 26 and 28 must then accommodate a fluctuating offset between the transmission output axis and the differential input axis.

A variety of types of universal joints are known. In the simplest types of universal joint, although the driving shaft and driven shaft are coupled, the instantaneous speed of the driven shaft differs slightly from the instantaneous speed of the driving shaft as a function of rotational position. Consequently, although the driving shaft may have a constant speed, the driven shaft speed may oscillate at a frequency proportional to the driving shaft speed. Due to the inertia associated with the driven shaft, this results in an oscillating torque level. The oscillating torque level may be perceived by vehicle occupants, especially if the frequency is close to a natural frequency of the driveline. Therefore, universal joints that maintain equal instantaneous speeds between the driving and driven shafts, called Constant Velocity (CV) joints, are desirable. Several types of CV joint mechanisms are known. Among known CV joint types, tripod joints and Rzeppa joints are common in automotive drivelines.

SUMMARY OF THE DISCLOSURE

A universal joint includes a ring having a ring axis coupled to a shaft having a shaft axis non-coincident with the ring axis. The universal joint may be a constant velocity joint. For example, the joint may include six balls that roll within concave grooves in the ring and convex grooves in the shaft. A flexible boot is fixed to the ring and to the shaft. A conical sleeve is fixed at a narrow end to the shaft such that a wide end covers the flexible boot, protecting it from damage from projectiles. To facilitate assembly, the sleeve includes a plurality of radially flexing leaves. The ring may define a plurality of holes such that the axes of the holes intersect the conical sleeve when the leaves are in a deployed position but do not intersect the leaves when they are in a stowed position. A retention strap may hold the leaves in a stowed position until after the joint is installed in the vehicle.

A vehicle driveshaft includes a shaft adapted for fixation to a differential at a first end and adapted for fixation to a transmission at a second end. At the second end, the driveshaft includes a ring coupled to the shaft such that the ring and the shaft may rotate about non-coincident axes. The ring is adapted for fixation directly to a transmission output shaft. For example, the ring may define a number of holes adapted to accept bolts that engage a transmission output shaft flange. A conical sleeve defining a number of radially flexing leaves is fixed at a narrow end to the shaft. In a deployed position, the leaves may protect a flexible boot fixed to both the shaft and the ring. Although the leaves may intersect the axes of the bolt holes in the deployed position, the leaves flex into a stowed position in which the bolts may be easily inserted. A retention strap may hold the leaves in the stowed position until the bolts have been inserted.

A method of assembling a vehicle includes position a U-joint ring adjacent to a driveline component flange, inserting fasteners from a shaft side of the ring into the flange, and then deploying the leaves of a conical sleeve to an extended position. For example, the leaves may be deployed by removing a retention strap. The driveline component may be, for example, a transmission output shaft, a differential input shaft or side shaft, or a wheel. The fastener may be, for example, a bolt.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
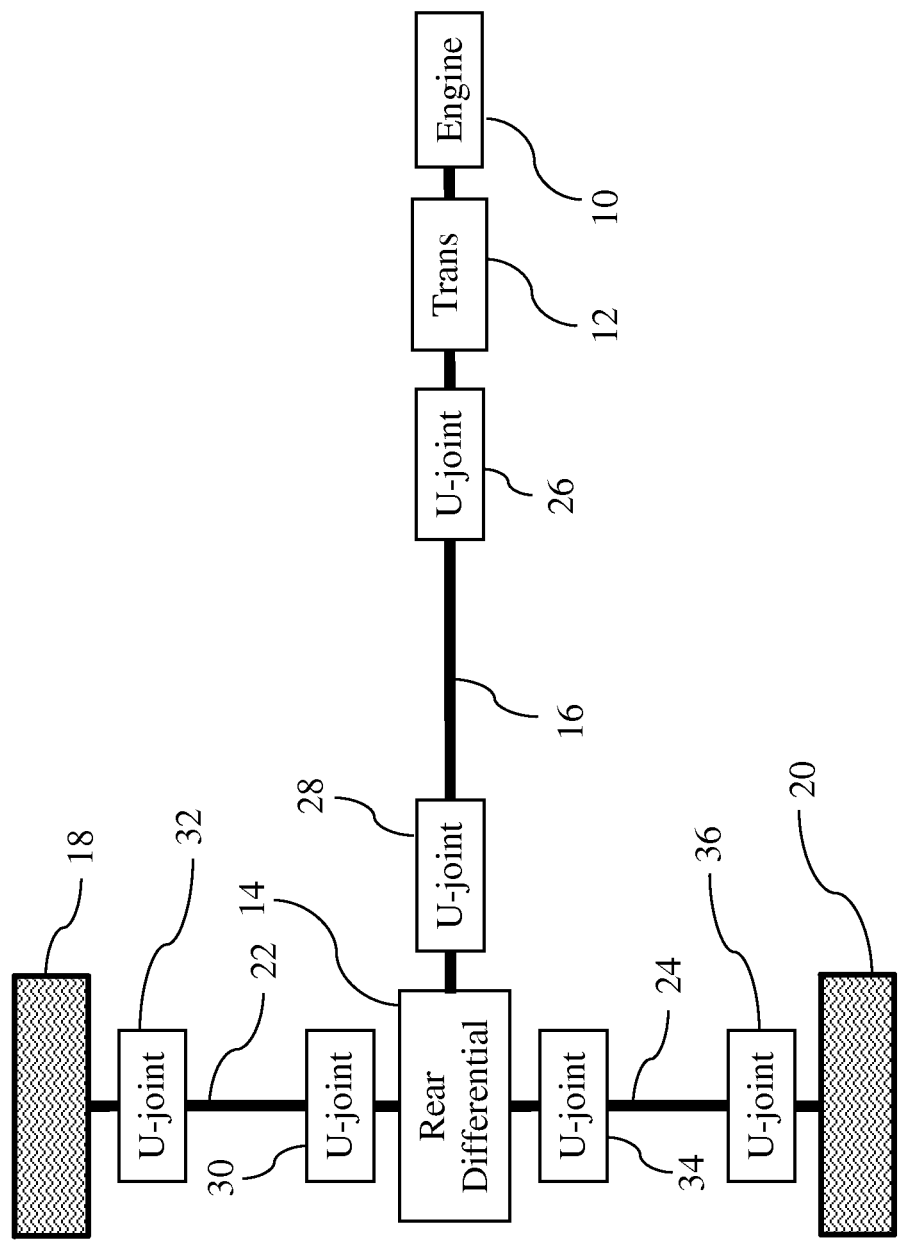
FIG. 1 is a schematic diagram of a vehicle powertrain.
Figure 2:
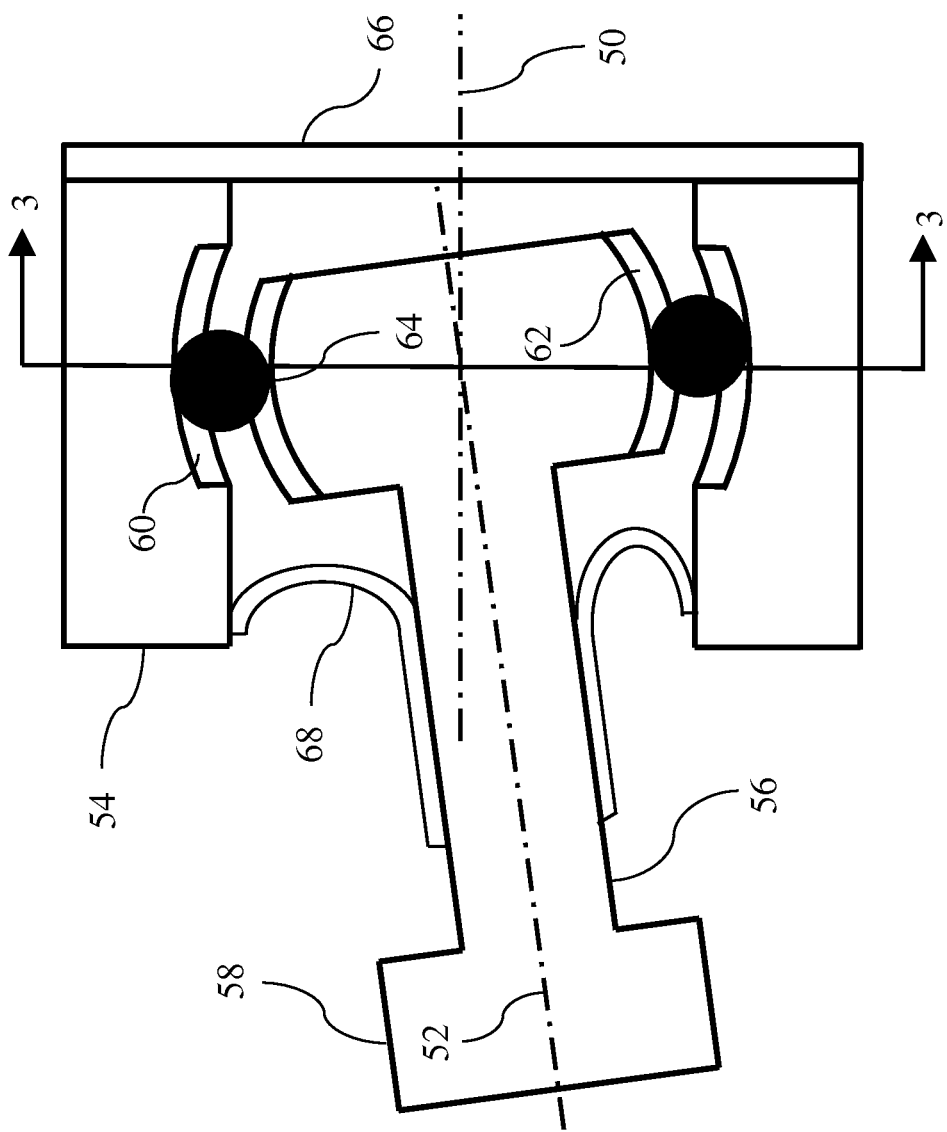
FIG. 2 is side cross section of a CV joint suitable for use in several location in the powertrain of FIG. 1.
Figure 3:
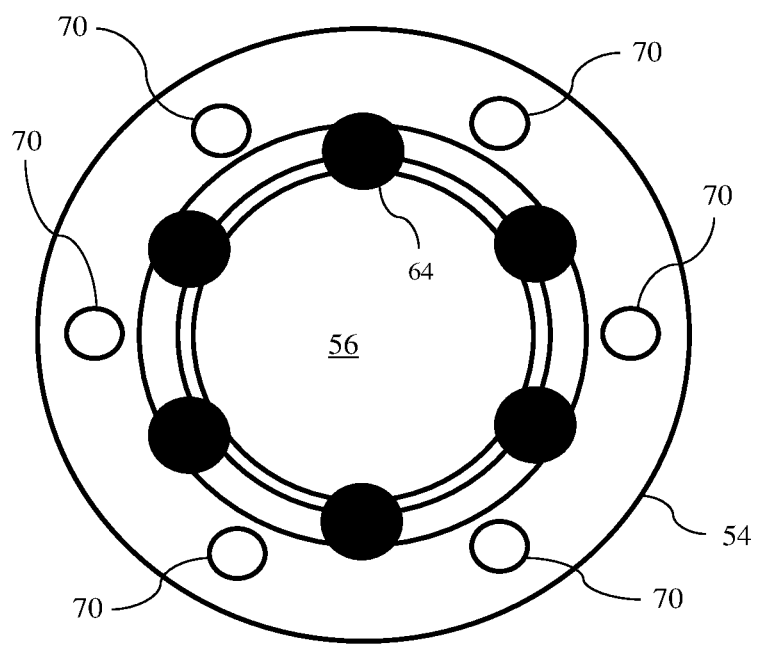
FIG. 3 is an end cross section of the CV joint of FIG. 2.
Figure 4:
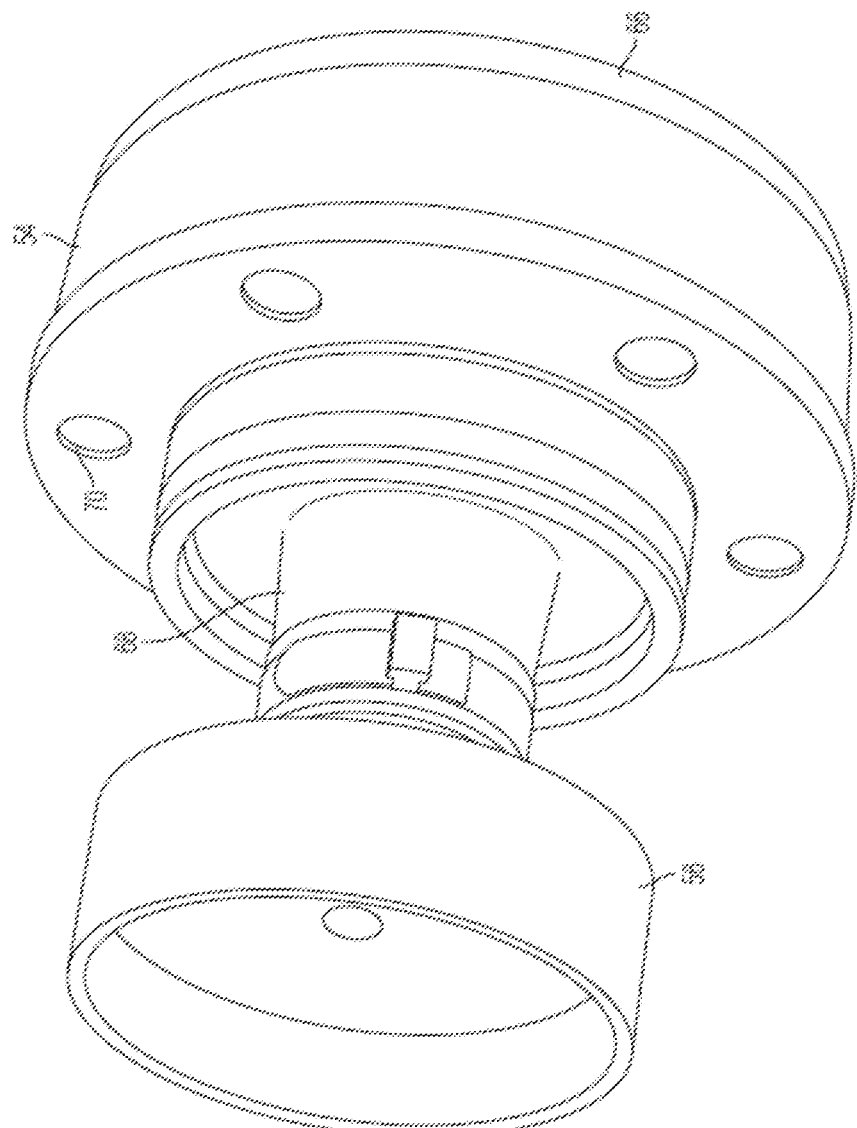
FIG. 4 is a pictorial view of the CV joint of FIG. 2.

FIGS. 2-4 illustrate a Rzeppa-type CV joint suitable for use at 26, 28, 30, 32, 34, and/or 36 in FIG. 1. FIG. 2 is a cross section in the plane defined by the centerlines 50 and 52 of the two sides of the joint. Ring 54 is adapted for fixation to the driveline component such as the transmission output shaft, the wheel, or the differential as described in detail below. Stub shaft 56 is adapted for fixation to driveshaft 16 or to an axle shaft 22 or 24. Stub shaft 56 may be fixed to the shaft by welding at the circumference of flange 58, for example. Six concave grooves 60 are formed in ring 54 and six convex grooves 62 are formed in stub shaft 52. Six balls 64, each positioned within a concave groove 60 and a convex groove 62, position stub shaft radially with respect to ring 54. The balls can roll within the grooves to accommodate the angle between axis 50 and axis 52. For example, as shown in FIG. 2, the ball at the top has rolled toward the left of the groove in ring 54 and has rolled toward the right end of the groove in stub shaft 56. The ball on the bottom has rolled the opposite direction. As either the ring or the stub shaft rotates about its respective axis, the balls force the other member to rotate by an equal amount such that the grooves line up at the ball locations. The balls may be retained by a cage (not shown).

Proper function of the joint requires lubrication, typically in the form of grease. A back plate 66 and a flexible boot 68 seal a cavity to retain the grease and to prevent contaminants from entering. Boot 68 is made of a flexible material to accommodate the different axes of rotation. During each revolution of the shafts, a particular circumferential portion of the boot changes from the shape shown at the top of FIG. 2 to the shape shown at the bottom of FIG. 2 and then back. A boot with the cross sectional shape shown in FIG. 2 is called a J-boot. In some applications, such as the underside of an off-road vehicle, the joint may be vulnerable to projectiles that may puncture the J-boot. If the grease leaks out or contaminants get in, friction may lead to rapid temperature increase and joint failure.

FIG. 3 is a cross section taken through the plane defined by the six balls 64. FIG. 4 is a pictorial view of the joint. Ring 54 defines six holes 70 that are used to fix the ring to the component, such as the transmission, differential, or wheel. Specifically, six bolts are inserted through the holes 70, from the side with the J-boot, into threaded holes in a flange of the component. Washers may be inserted to distribute the compressive force from the bolt head across the face of ring 54. In some cases, it may be necessary to rotate the shaft after inserting some of the bolts in order to be able to reach the remaining bolts with an appropriate tool. The shaft may be welded to the stub shaft 54 prior to positioning the shaft assembly into the vehicle.

Figure 5:
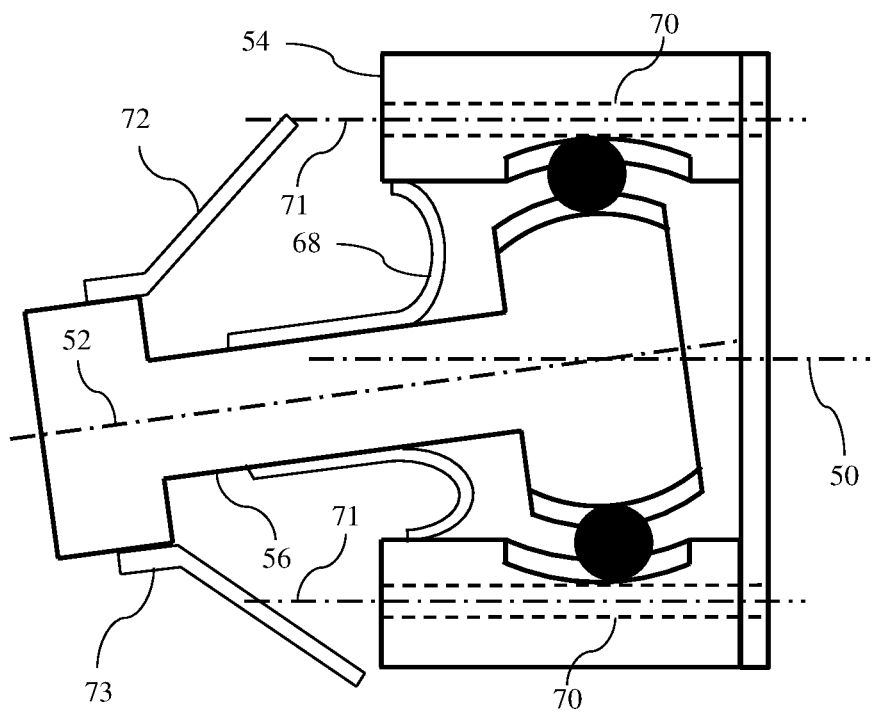
FIG. 5 is a side cross section of the CV joint of FIG. 2 with a protective shield in a deployed position.
Figure 6:
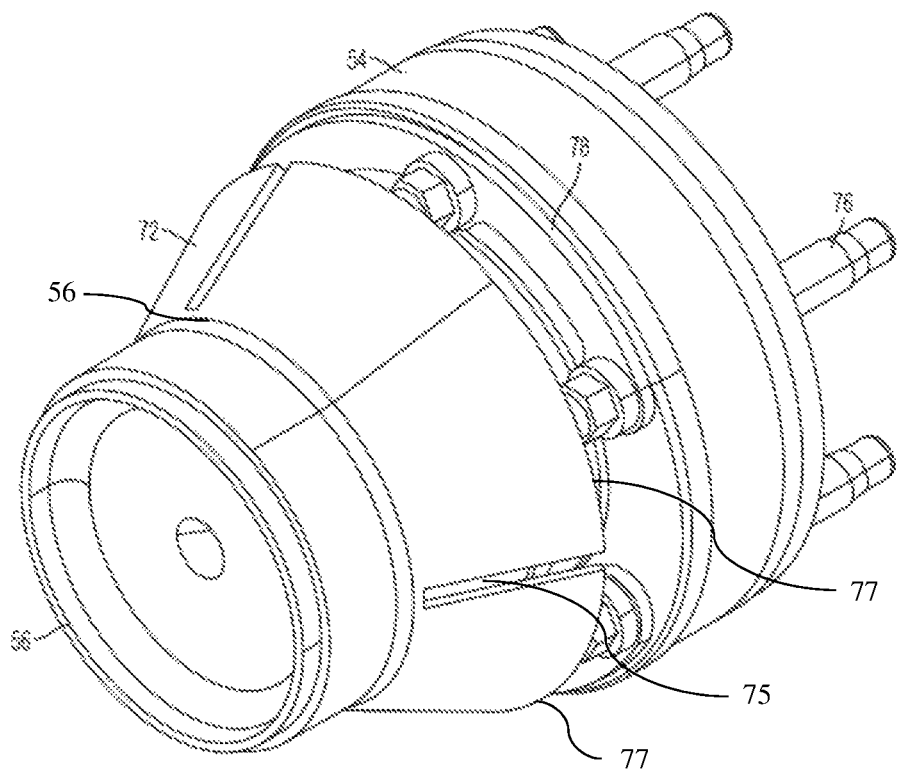
FIG. 6 is a pictorial view of the CV joint of FIG. 2 with a protective shield in a deployed position.

FIGS. 5 and 6 show the CV joint of FIGS. 2-4 with a protective shield 72. FIG. 5 is a cross section in the same plane as FIG. 2. The protective shield 72 is conical in shape with a narrow end 73 fastened to the stub shaft 56 and a wide end protecting the J-boot from projectiles. For example, the shield may welded to the shaft or fastened by a clamp. Conical, in this context, means that the shield is significantly wider at one end than at the other and is generally circular in cross section. The taper angle is not necessarily constant. Although some gap still exists at the top, the shield protects the J-boot from large projectiles on all sides and from small projectiles on some sides. The shield also limits the directions from which a projectile can impact the J-boot. As seen on FIG. 5, a projectile would only impact the J-boot if it is travelling nearly vertically, in which case it would hit the portion of the J-boot that is in contact with the shaft and therefore less susceptible to puncture. In this position, the axes 71 of the holes 70 intersect the protective shield.

FIG. 6 is a pictorial view of the CV joint with protective shield 72. FIG. 6 also shows the six bolts 76 and the washers 78 used to fasten ring 54 to a component flange. Note that the shield 72 defines a number of slits 75 that divide the shield into a number of separate leaves. Also note that the shield restricts access to the heads of the bolts 76. To accommodate assembly, the leaves are designed to flex radially to permit access to the bolt heads during assembly. After assembly, the leaves spring into the deployed position shown in FIGS. 5-6.

Figure 7:
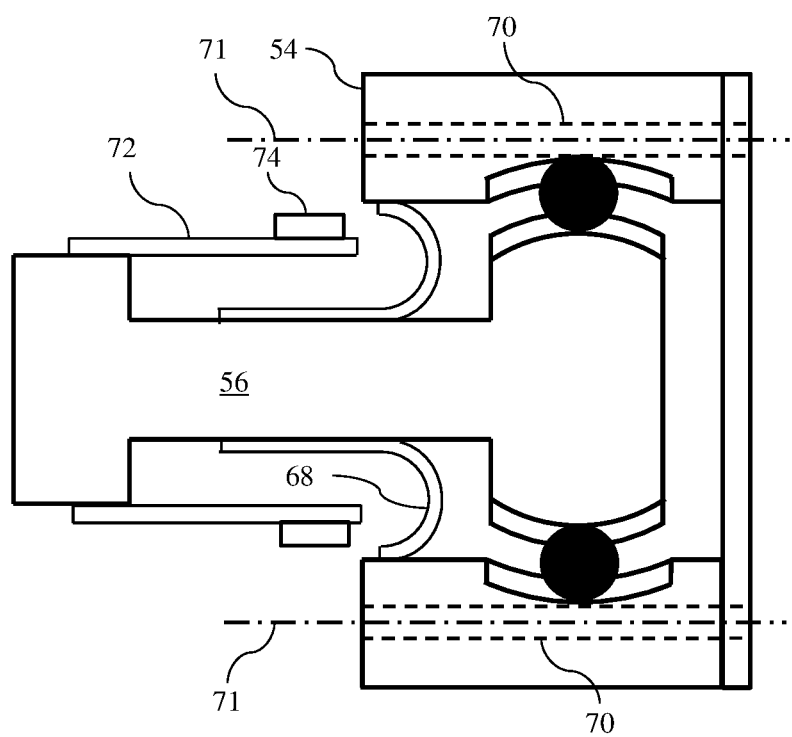
FIG. 7 is a side cross section of the CV joint of FIG. 2 with a protective shield in a stowed position.
Figure 8:
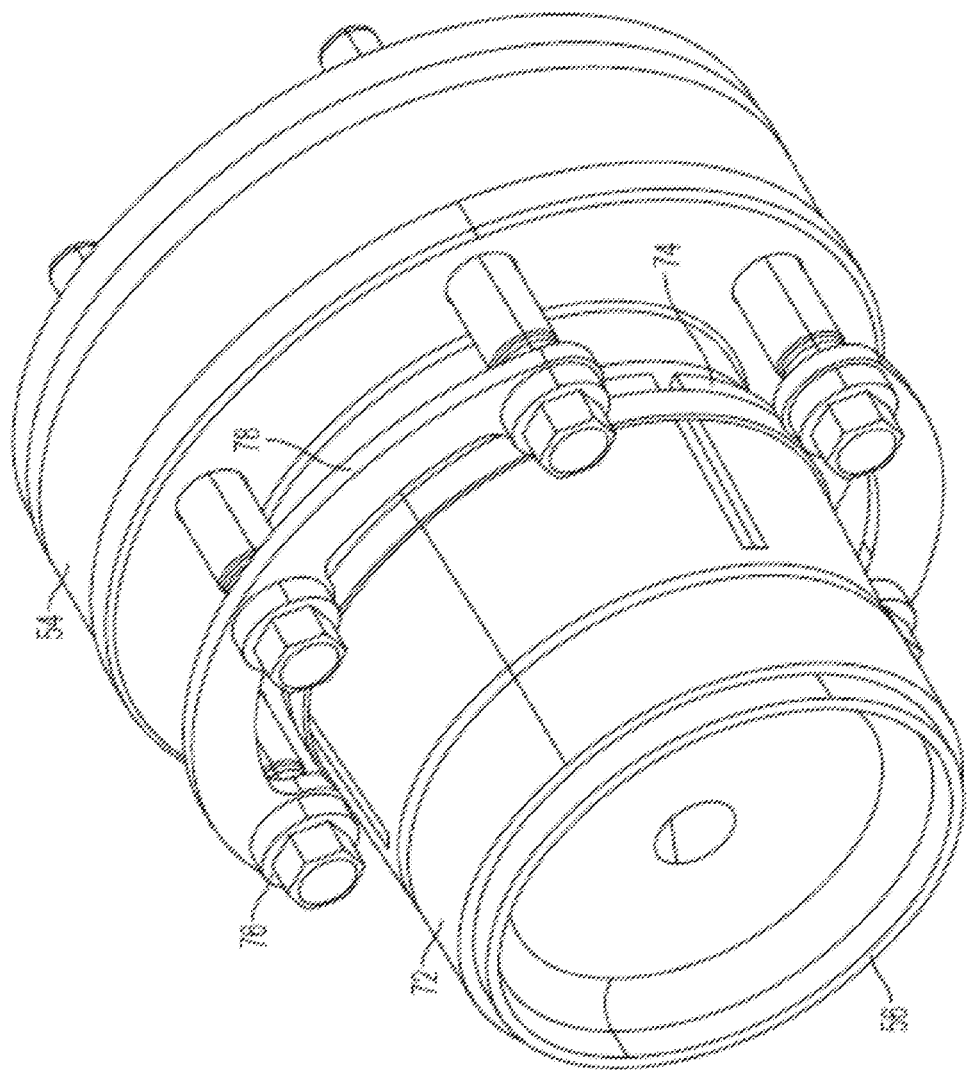
FIG. 8 is a pictorial view of the CV joint of FIG. 2 with a protective shield in a stowed position.

FIGS. 7 and 8 show the CV joint with the shield 72 in a stowed condition suitable for vehicle assembly. In this condition, the leaves have been flexed inwardly such that they no longer obstruct access to the bolts 76. The axes 71 of the holes 70 do not intersect the protective shield in this position. The leaves may overlap one another somewhat in this condition. The shape of the leaves may depart from a pure conical shape in order to facilitate the radial flexing and to permit overlapping. The leaves are not necessarily identical to one another. The leaves may be held in this stowed condition by a strap 74.

Figure 9:
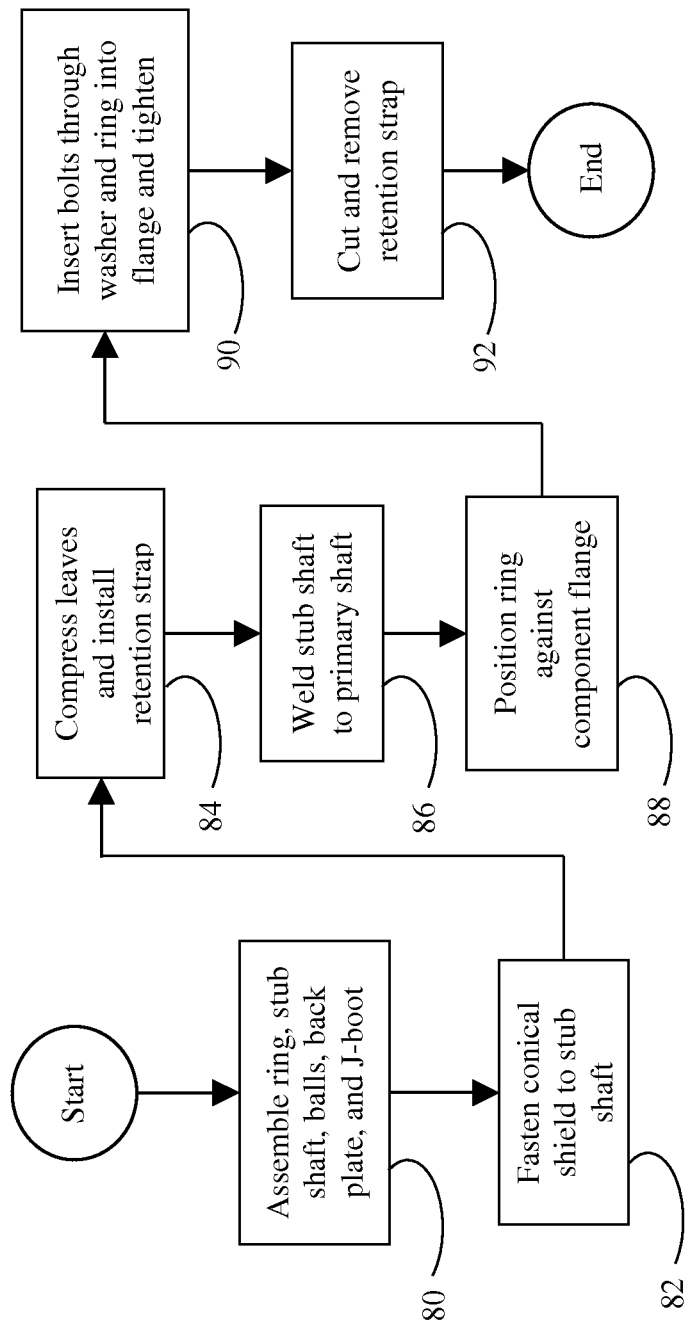
FIG. 9 is a flow chart for a process of assembling and installing the CV joint of FIGS. 5-8.

FIG. 9 is a flow chart illustrating the process of assembling and installing the CV joint with a protective shield. The sequencing of steps may differ from that shown in FIG. 9. Some of the step may be performed at different facilities than other steps. At 80, the V joint components except the protective shield are assembled in the traditional manner. At 82, the narrow end of the conical protective shield 72 is fastened to the stub shaft 56. At 84, the leaves of the protective shield are compressed into the position shown in FIGS. 7 and 8 and the retention strap 74 is installed. At 86, stub shaft 56 is welded to the primary shaft, for example driveshaft 16 or axles shaft 22 or 24. At 88, the shaft assembly including the CV joint is positioned in the vehicle. At 90, the bolts are inserted through the ring into the flange of the vehicle component and tightened. The vehicle component may be, for example, a transmission output shaft, a differential input shaft or output shaft, or a wheel. The bolts may be pre-inserted in the ring prior to positioning in the vehicle. In some cases, it may be necessary to rotate the shaft assembly after installing some of the bolts in order to bring other holes into an accessible vehicle location. After the bolts are properly tightened, the retention strap is removed and the leaves deploy into the position shown in FIGS. 5 and 6. If a CV joint with a protective shield is to be installed at both ends of the shaft, then the steps of FIG. 9 are repeated for each end.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle driveshaft comprising:
   a shaft having a shaft axis and adapted for fixation at a first end to a differential;
   a ring adapted for fixation to a transmission and coupled to a second end of the shaft to rotate about a ring axis non-coincident with the shaft axis, the ring defining a plurality of holes, each hole having a hole axis; and
   a conical sleeve fixed at a narrow end to the shaft and having a number of leaves configured to flex radially between a deployed position in which the hole axes intersect the conical sleeve and a stowed position in which the hole axes do not intersect the conical sleeve.

2. The driveshaft of claim 1 further comprising a flexible boot fixed to the ring and to the shaft.

3. The driveshaft of claim 2 further comprising a retention strap configured to hold the leaves in a stowed position.

4. The driveshaft of claim 2 further comprising:
   six balls each configured to roll within a respective convex groove in the shaft and within a respective concave groove in the ring.

\* \* \* \* \*